(12) United States Patent
Mickowski

(10) Patent No.: US 10,767,664 B2
(45) Date of Patent: Sep. 8, 2020

(54) POWER CLUTCH ACTUATING DEVICE

(71) Applicant: John R. Mickowski, Warwick, NY (US)

(72) Inventor: John R. Mickowski, Warwick, NY (US)

(*) Notice: Subject to any disclaimer, the term of this patent is extended or adjusted under 35 U.S.C. 154(b) by 24 days.

(21) Appl. No.: 16/114,584

(22) Filed: Aug. 28, 2018

(65) Prior Publication Data

US 2019/0257324 A1 Aug. 22, 2019

Related U.S. Application Data

(60) Provisional application No. 62/632,709, filed on Feb. 20, 2018.

(51) Int. Cl.
| | | |
|---|---|---|
| *F15B 3/00* | (2006.01) | |
| *F15B 7/08* | (2006.01) | |
| *F16D 25/00* | (2006.01) | |
| *F15B 17/00* | (2006.01) | |

(52) U.S. Cl.
CPC .............. *F15B 3/00* (2013.01); *F15B 7/08* (2013.01); *F15B 17/00* (2013.01); *F16D 25/00* (2013.01)

(58) Field of Classification Search
CPC ...... F15B 3/00; F15B 7/00; F15B 7/08; F15B 17/00; F16D 25/14
See application file for complete search history.

(56) References Cited

U.S. PATENT DOCUMENTS

| | | | | | |
|---|---|---|---|---|---|
| 5,061,016 | A * | 10/1991 | Hirobe | ................... | B60T 8/441 60/565 |
| 5,273,143 | A * | 12/1993 | Voss | ....................... | F16D 48/066 192/3.58 |
| 5,330,259 | A * | 7/1994 | Ravndal | .................. | B60T 8/346 60/560 |
| 5,906,256 | A * | 5/1999 | Hayashi | ................. | F16D 25/14 192/3.58 |
| 6,196,369 | B1 * | 3/2001 | Willert | ................... | F16D 25/082 192/85.53 |
| 7,404,292 | B2 * | 7/2008 | Kremer | ............... | F15B 11/0423 60/591 |
| 8,522,942 | B2 * | 9/2013 | Bell | ....................... | F16D 25/088 192/104 F |
| 8,544,624 | B2 * | 10/2013 | Grethel | ..................... | F15B 3/00 192/3.58 |
| 9,803,702 | B2 * | 10/2017 | Heubner | ................... | F15B 7/08 |

* cited by examiner

*Primary Examiner* — Michael Leslie

(74) *Attorney, Agent, or Firm* — Howson & Howson LLP

(57) ABSTRACT

A clutch actuating device has an actuating cylinder with piston and rod-side chamber, a multiplier cylinder with piston-side and rod-side chambers separated by a piston, a rod(s) interconnecting the pistons, and a directional control valve. The valve has a pilot port, ports in fluid connection with piston-side and rod-side chambers of the multiplier cylinder, and a port in fluid connection with a secondary source. When a first fluid pressure (P1) from a first pressure source is applied to the pilot port and rod-side chamber of the actuating cylinder, a second fluid pressure (P2) is applied to the piston-side chamber of the multiplier cylinder by the secondary source. This results in the first and second fluid pressures (P1 and P2) acting on the piston of the actuating cylinder to produce a clutch actuation fluid pressure.

19 Claims, 2 Drawing Sheets

POWER CLUTCH ACTUATING DEVICE

CROSS REFERENCE TO RELATED APPLICATIONS

This application claims the benefit under 35 USC § 119(e) of U.S. Provisional Patent Application No. 62/632,709, filed Feb. 20, 2018.

BACKGROUND

The present invention relates to a clutch actuating device for forming an interconnection between a master cylinder and a slave cylinder of a hydraulic clutch mechanism providing a drive connection between an engine and a transmission of a motorized vehicle or like equipment, and more particularly, the present invention relates to a clutch actuating device that enables a reduction in operator force and effort needed to operate a clutch lever.

The amount of effort required to operate a clutch on a motorcycle, for instance, may vary a great deal depending upon how much torque the clutch must absorb from the engine. Thus, the more powerful the engine, the stronger the effort required to release the clutch. Accordingly, as motorcycle engines have become more powerful, particularly for larger motorcycles, clutches necessarily must be made stronger to withstand the increased torque. As a result, greater grip strength by the motorcycle operator is required to the point where strains on the hands, wrist and forearm muscles may become excessive for at least some operators. For instance, this strain can make driving the motorcycle in city traffic, or for a long period of time, fatiguing and even painful for some drivers. In some cases, finger cramps can prevent the operator from operating the clutch, resulting in a potentially dangerous lack of control.

Traditionally, clutches have been cable actuated by a lever provided on the handlebars which connects to a linkage that releases the clutch. More recently, hydraulic actuated clutches have been used. However, on larger motorcycles, the effort to operate a hydraulic clutch lever is essentially the same as that of the cable driven variety, and many riders find that the effort required causes considerable fatigue after riding for an extended period of time, particularly in traffic. The effort required prevents some people from considering the purchase and use of larger displacement engine motorcycles.

SUMMARY

According to an aspect of the present invention, a clutch actuating device for connection and installation between a master cylinder and a slave cylinder of a clutch system is provided. The clutch actuating device includes: an actuating cylinder having a piston and rod-side chamber which is in fluid connection with a primary pressure source, typically the motorcycle's master cylinder; a multiplier cylinder having a piston-side chamber and a piston; a rod or series of interconnected rods extending from the piston of the multiplier cylinder to the piston of the actuating cylinder; and a directional control valve. The directional control valve has a pilot port in fluid connection with the primary pressure source, a port in fluid connection with the piston-side chamber of the multiplier cylinder, and a port in fluid connection with a secondary pressure source. When a first fluid pressure (P1) from the first pressure source is simultaneously applied to the pilot port of the directional control valve and the rod-side chamber of the actuating cylinder, a second fluid pressure (P2) is applied to the piston-side chamber of the multiplier cylinder by the secondary pressure source via the directional control valve. This results in the second fluid pressure (P2), transmitted via the rod or series of interconnected rods, and the first fluid pressure (P1) jointly acting on the piston of the actuating cylinder to produce a clutch actuation fluid pressure needed to release the clutch.

BRIEF DESCRIPTION OF THE DRAWINGS

The foregoing and other objects, features and advantages of the embodiments disclosed herein should become apparent from the following description when taken in conjunction with the accompanying drawings.

DETAILED DESCRIPTION

Figure 1:
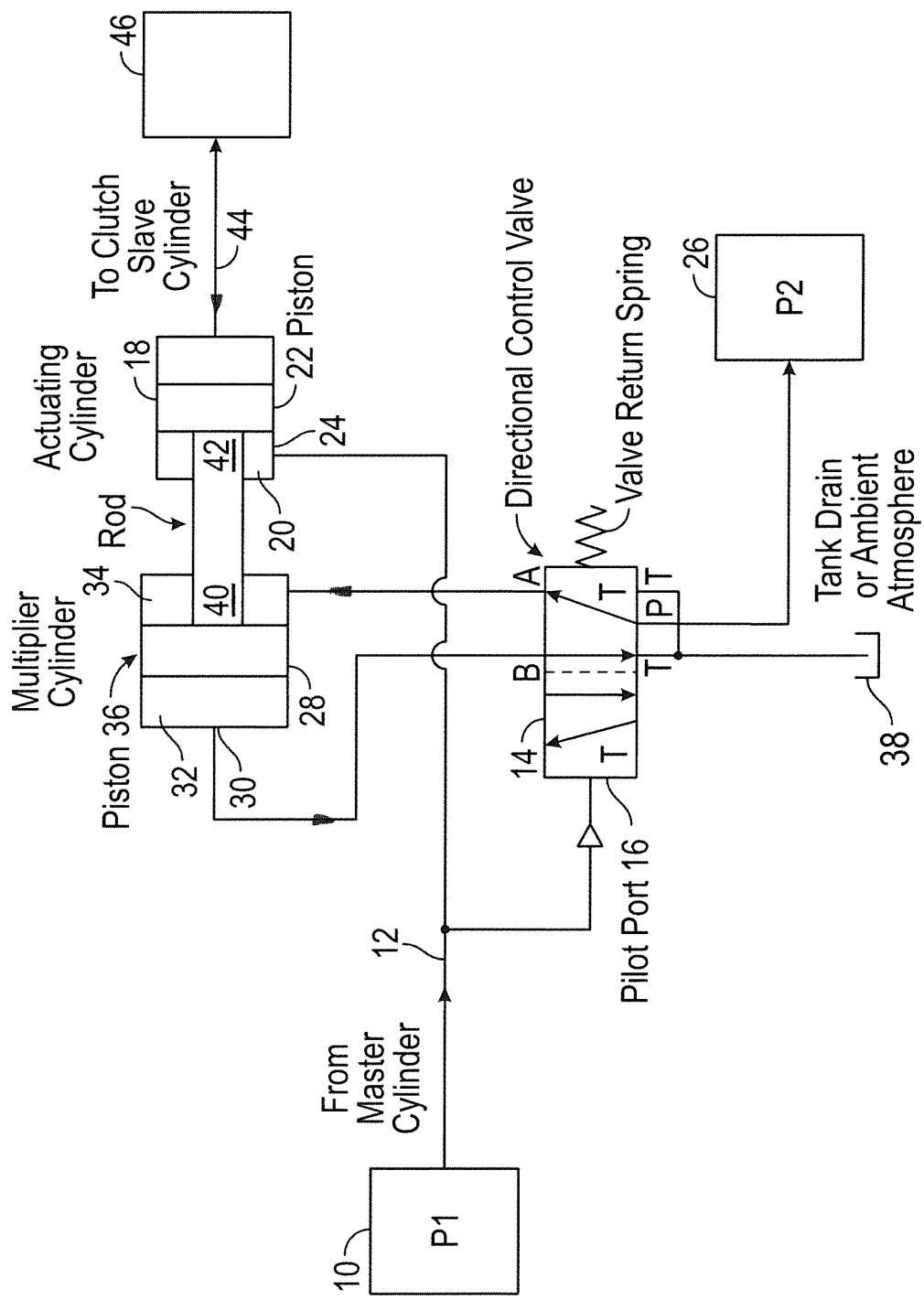
FIG. 1 is a schematic view of a motorcycle clutch actuating device installed between a master cylinder and a slave cylinder of a clutch in a condition in which clutch plates of the clutch are engaged according to an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known devices, apparatus, methods and structures have not been described in detail so as not to unnecessarily obscure the embodiments.

In general, a motor vehicle having manual transmission may be equipped with a mechanical clutch system or a hydraulic clutch system. Both systems share the same function, which is to transfer the rotational movement of the engine to the transmission. The motor vehicle may be a motorcycle, truck, automobile, all-terrain vehicle (ATV), or like motorized vehicle or any other equipment having a clutch system. Although a clutch actuating device for a motorcycle is discussed below, the clutch actuating device according to the present invention may be used in any clutch system and is not limited to motorcycles.

On a motorcycle, a clutch is typically operated by a hand lever on the left handlebar. Typically, no pressure on the lever means that clutch plates are engaged (driving), while pulling the lever back towards the rider disengages the clutch plates through cable or hydraulic actuation, allowing the rider to shift gears or coast.

The clutch may include a series of spinning discs that move a very short distance (a fraction of an inch) to couple and uncouple power moving from the engine to the wheel. This movement is transferred from the lever to the clutch typically through either a cable that moves within a stationary housing, or via a master cylinder exerting pressure on fluid to move a corresponding slave cylinder at the clutch. Thus, the clutch is able to temporarily disconnect the engine from the transmission and such disconnection is essential for safe operation of a motorcycle.

Accordingly, on a motorcycle, the clutch lever is pulled to disengage the transmission, and is then slowly let out to enable the transmission gears to engage with the engine so that the motorcycle moves under power. Inside the clutch, there are a series of friction plates that are generally round, with a hole in the center, and that fit over a clutch hub. Pulling the clutch lever releases the pressure that keeps the friction plates touching tight against each other, allowing the flywheel to spin freely. Releasing the lever results in the friction plates catching on each other and engaging the engine to the transmission. Accordingly, when changing gears, the transmission is disengaged from the engine for a moment, gear alignment is switched, then reengaged. The friction plates enable a rider to negotiate the disengagement and reengagement smoothly.

In general, a hydraulic clutch operates under fluid pressure and may include the following basic components: a master cylinder, a slave cylinder, a clutch fork, a flywheel, a clutch plate, a pressure plate, and a clutch release bearing. The clutch moves with the engine, allowing a gradual and smooth transfer of power from the engine to the transmission, through the flywheel. When the clutch is actuated, it pushes a rod that is linked to the master cylinder, which is connected to a hydraulic fluid reservoir. Hydraulic fluid is then forced to flow under pressure into the clutch slave cylinder, and the hydraulic pressure formed in the process activates a pushrod in the slave cylinder. The pushrod moves against the clutch fork pushing the clutch release bearing. Pressure may be further transferred to a diaphragm spring, pulling the pressure plate away from the clutch plate. At this point, the clutch is no longer engaged to the engine. The power is now interrupted, and the driver can coast and/or shift into another gear without causing damage to the transmission.

Embodiments disclosed herein are directed to a hydraulic clutch actuator used in place of a simple mechanical lever and cable assembly, and more particularly, to a power clutch actuating device that multiplies the pressure delivered by a hydraulic clutch actuator. The clutch actuating device is connected between the master cylinder and slave cylinder of a conventional hydraulic clutch as disclosed below.

As discussed above, the effort required by a motorcycle driver to operate a hydraulic clutch lever, particularly on a larger motorcycle, is approximately the same as the conventional mechanical cable driven variety. However, embodiments of a clutch including a clutch actuating device as disclosed herein require significantly less effort to use. As a result, operating a motorcycle equipped with a power clutch actuating device as disclosed herein is much less tiring and far more enjoyable. Embodiments disclosed herein may be retrofitted to existing motorcycles with minimal modification to Original Equipment Manufacturer (OEM) design or can be included in new motorcycles without changing the OEM handlebar, master cylinder or the slave cylinder that actuates the clutch. Of course, the clutch actuating device may also be installed in other vehicles and equipment and is not limited to installations on motorcycles.

Figure 2:
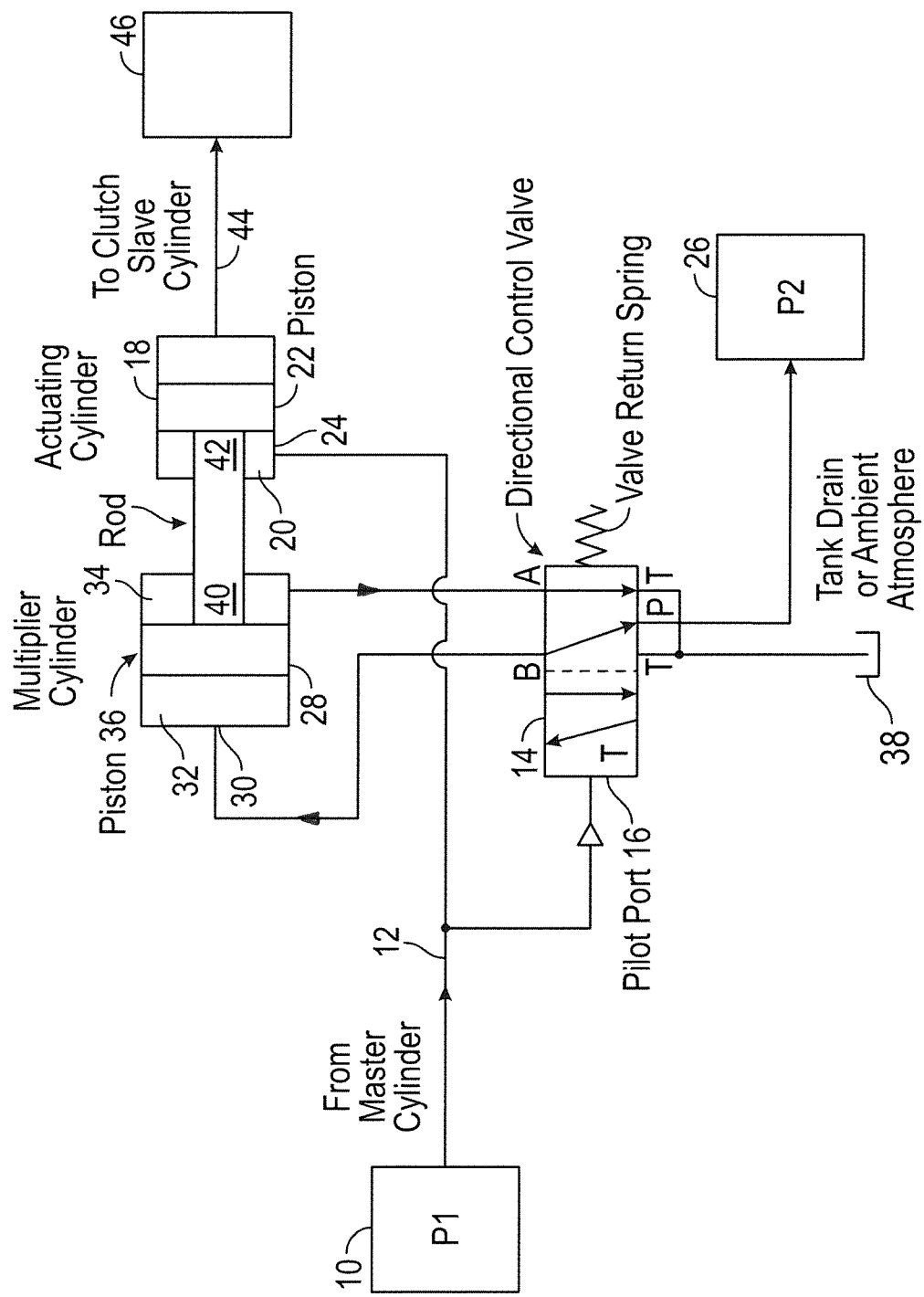
FIG. 2 is a schematic view of a motorcycle clutch actuating device installed between a master cylinder and a slave cylinder of a clutch as shown in FIG. 1 in a condition in which clutch plates of the clutch are disengaged according to an embodiment.

Referring to FIGS. 1 and 2, the basic principle and theory of operation of the embodiments are that a secondary pressure source (P2) is used to supply additional power to actuate the clutch, thereby reducing the pressure required from the master cylinder (P1), and in turn reducing the gripping force required on the handlebar lever of a motorcycle. The secondary source (P2) may be provided by the motor's lubrication oil pressure source, or other source, such as, for example, a compressed air supply.

FIG. 1 shows the condition of the clutch actuating device before a clutch level is pulled or after a clutch lever is released (i.e., pressure (P1) is effectively equal to zero). FIG. 2 shows the condition of the clutch actuating device when a clutch lever is pulled (i.e., when pressure (P1) from the master cylinder is applied).

By way of example, when a handlebar lever (not shown) of a motorcycle is pulled in to disengage the clutch (see FIG. 2), a master cylinder 10 of the clutch forces fluid under pressure (P1) into a hose or other fluid conduit 12 interconnected to the clutch actuating device of the present invention. According to embodiments disclosed herein, the hose 12 is connected to a pilot port 16 of a directional control valve 14 and a rod-side chamber 20 of an actuating cylinder 18 defined by a piston 22 within the actuating cylinder 18. This places the directional control valve 14 in a condition as shown in FIG. 2.

Pressure (P1) from the master cylinder 10 applied to the pilot port 16 of the directional control valve 14 causes an internal shift of the passages in the directional control valve 14 and simultaneously applies force to the actuating piston 22 via a fluid inlet 24 of the rod-side chamber 20 of the actuating cylinder 18. When the directional control valve 14 shifts based on the applied pressure (P1) as stated above, a second source 26 of pressure (P2) is thereby connected and applied to a fluid inlet 30 of a piston-side chamber 32 of a multiplier cylinder 28 via the directional control valve 14. In addition, fluid in a rod-side chamber 34 of the multiplier cylinder 28 is permitted to drain or flow to a tank 38 or into ambient atmosphere via the directional control valve 14, which thereby releases any back pressure in the multiplier cylinder 28. The multiplier cylinder includes a piston 36 which defines and separates the piston-side and rod-side chambers, 32 and 34, of the multiplier cylinder 28.

The multiplier cylinder 28 has a rod 40 that is physically connected to a rod 42 of the actuating cylinder 18. Rods, 40 and 42, may be configured as a single rod or a series of interconnected rods. Thus, the force (P2) provided by the rod 40 of the multiplier cylinder 28 adds to the force (P1) applied by the master cylinder 10 to the piston 22 of the actuating cylinder 18. The combination of the two forces (P1+P2) on the piston 22 of the actuating cylinder 18 delivers a required clutch actuation fluid pressure from the piston 22 of the actuator cylinder 18, which is in turn connected by a hose or other fluid conduit 44 to the slave cylinder 46 of the clutch, thereby releasing the clutch.

When the handlebar lever is released to engage the clutch (see FIG. 1), the pressure (P1) from the master cylinder 10 is simultaneously removed from the pilot port 16 of the directional control valve 14 and the rod-side chamber 20 of the actuating cylinder 18 (i.e., pressure (P1) is effectively equal to zero). This alters the configuration of the passages within the directional control valve 14 such that, fluid from the piston-side chamber 32 of the multiplier cylinder 28 is permitted to drain to the tank or ambient atmosphere 38 via the directional control valve 14 and fluid at pressure (P2) is directed to the rod-side chamber 34 of the multiplier cylinder 28 to return the piston 36 and rod 40 to their original or normal positions. At the same time, back pressure from the clutch slave cylinder 46 pushes the piston 22 of the actuating cylinder 18 back along with the piston 36 of the multiplier cylinder 28. This movement forces fluid out of the rod-side chamber 20 of the actuating cylinder 18, which pushes a piston (not shown) of the master cylinder 10 and the handlebar lever (not shown) back to its relaxed position and permits the clutch to fully engage.

As an alternative, a spring or like mechanism (not shown) may be provided in the rod-side chamber 34 of the multiplier cylinder 28 to return the piston 36 and rod 40 to their original or normal positions. In addition, the secondary pressure source may be a motor lubrication oil pressure source or a compressed air pressure source. If the secondary pressure source is a motor lubrication oil pressure source, then the clutch actuating device would include a tank to which fluid may be directed to release the fluid pressure in the piston-side or rod-side chamber of the multiplier cylinder. Alternatively, if the secondary pressure source is a source of compressed air, then the clutch actuating device could release the compressed air to ambient atmosphere to release the fluid pressure in the piston-side or rod-side chamber of the multiplier cylinder.

The dimensions of the multiplier cylinder 28 and actuating cylinder 18 may be selected to deliver a correct and/or desired amount of fluid pressure (P2) to the clutch slave cylinder 46 while substantially reducing the pressure (P1) required from the master cylinder 10 to actuate or disengage the clutch. By virtue of the reduced pressure requirement, the effort required by a motorcycle driver to squeeze the handlebar lever may be considerably reduced. In addition, the above referenced clutch actuating device may be used on any motorized vehicle or equipment having a hydraulic clutch.

The foregoing description and specific embodiments are merely illustrative of the principles thereof, and various modifications and additions may be made to the apparatus by those skilled in the art, without departing from the spirit and scope of this invention.

The invention claimed is:

1. A clutch actuating device, comprising:
   a multiplier cylinder in fluid connection with a secondary pressure source;
   a rod or a series of interconnecting rods extending from the multiplier cylinder to an actuating cylinder; and
   a directional control valve including a pilot port in fluid connection with a primary pressure source, a port in fluid connection with a piston-side chamber of the multiplier cylinder, and a port in fluid connection with the secondary pressure source;
   wherein, when a first fluid pressure (P1) from the primary pressure source is applied to the pilot port of the directional control valve, a second fluid pressure (P2) is applied to the piston-side chamber of the multiplier cylinder by the secondary pressure source via the directional control valve, such that the second fluid pressure (P2) transmitted by the rod or series of rods acts on a piston of the actuating cylinder to produce a clutch actuation fluid pressure.

2. The clutch actuating device according to claim 1, wherein the clutch actuating device is installed between a master cylinder and a slave cylinder of a hydraulic clutch.

3. The clutch actuating device according to claim 2, wherein the primary pressure source is the master cylinder providing hydraulic fluid to the pilot port of the directional control valve and a rod-side chamber of the actuating cylinder.

4. The clutch actuating device according to claim 2, wherein the secondary pressure source is a motor lubrication oil pressure source or a compressed air pressure source.

5. The clutch actuating device according to claim 2, wherein the actuating cylinder includes a clutch actuation chamber in fluid connection with the slave cylinder such that the clutch actuation fluid pressure produced in the actuating cylinder is applied to the slave cylinder.

6. The clutch actuating device according to claim 1, wherein the multiplier cylinder has a rod-side chamber and the directional control valve includes a port in fluid connection with the rod-side chamber of the multiplier cylinder, and wherein, when the first fluid pressure (P1) from the primary pressure source is applied to the pilot port of the directional control valve, pressure in the rod-side chamber of the multiplier chamber is released via a connection to the directional control valve.

7. The clutch actuating device according to claim 6, wherein, when the first fluid pressure (P1) from the primary pressure source is ceased to be applied to the pilot port of the directional control valve, the directional control valve shifts to permit pressure in the piston-side chamber of the multiplier cylinder to be reduced and to permit fluid pressure to increase in the rod-side chamber of the multiplier chamber such that second fluid pressure (P2) acts on a piston of the multiplier cylinder to retract the rod or series of rods into the rod-side chamber of the multiplier cylinder and to retract the piston of the actuating cylinder toward a rod-side chamber of the actuating cylinder.

8. The clutch actuating device according to claim 1, wherein the multiplier cylinder has a rod-side chamber with a spring such that, when the first fluid pressure (P1) from the primary pressure source is ceased to be applied to the pilot port of the directional control valve, the directional control valve shifts application of the second fluid pressure (P2) away from the piston-side chamber of the multiplier cylinder to permit a piston of the multiplier cylinder to retract the rod or series of rods into the rod-side chamber of the multiplier cylinder at least partly via force of the spring.

9. The clutch actuating device according to claim 1, wherein the rod or series of rods includes a rod extending from a piston of the multiplier cylinder interconnected to a rod extending from the piston of the actuating cylinder.

10. The clutch actuating device according to claim 1, wherein the secondary pressure source is a motor lubrication oil pressure source and wherein the clutch actuating device includes a tank in fluid communication with a port of the directional control valve.

11. The clutch actuating device according to claim 1, wherein the secondary pressure source is a compressed air pressure source and wherein the directional control valve includes a port in fluid communication with ambient atmosphere.

12. The clutch actuating device according to claim 1, wherein the primary pressure source is in fluid connection with the actuating cylinder such that, when the first fluid pressure (P1) from the primary pressure source is applied to the pilot port of the directional control valve, the first fluid pressure (P1) is simultaneously applied to a rod-side chamber of the actuating cylinder and, when the second fluid pressure (P2) is applied to the piston-side chamber of the multiplier cylinder by the secondary pressure source via the directional control valve, the second fluid pressure (P2) transmitted by the rod or series of rods and the first fluid pressure (P1) jointly act on the piston of the actuating cylinder to produce the clutch actuation fluid pressure.

13. A hydraulic clutch actuating device operable via a clutch lever, comprising:
   a master cylinder having an output of hydraulic fluid at a first fluid pressure (P1) when the clutch lever is pulled;
   an actuating cylinder having a piston, rod-side chamber, and a clutch actuation chamber, the rod-side chamber being in fluid connection with the output of the master cylinder;
   a slave cylinder in fluid connection with the clutch actuation chamber of the actuating cylinder;
   a multiplier cylinder having a piston-side chamber and a rod-side chamber separated by a piston;

a rod or a series of interconnecting rods extending from the piston of the multiplier cylinder through the rod-side chamber of the multiplier cylinder to the piston of the actuating cylinder through the rod-side chamber of the actuating cylinder;

a secondary pressure source; and a directional control valve including a pilot port in fluid connection with the output of the master cylinder, a port in fluid connection with the piston-side chamber of the multiplier cylinder, and a port in fluid connection with the secondary pressure source; and wherein, when the first fluid pressure (P1) from the master cylinder is simultaneously applied to the pilot port of the directional control valve and the rod-side chamber of the actuating cylinder, a second fluid pressure (P2) is applied to the piston-side chamber of the multiplier cylinder by the secondary pressure source via the directional control valve, such that the second fluid pressure (P2) transmitted by the rod or series of rods and the first fluid pressure (P1) jointly act on the piston of the actuating cylinder to produce a clutch actuation fluid pressure that is applied to the slave cylinder.

14. The hydraulic clutch actuating device according to claim 13, wherein the secondary pressure source is a motor lubrication oil pressure source.

15. The hydraulic clutch actuating device according to claim 13, wherein the secondary pressure source is a compressed air pressure source.

16. The hydraulic clutch actuating device according to claim 13, wherein, when the clutch lever is released and the first fluid pressure (P1) from the master cylinder is ceased to be applied to the pilot port of the directional control valve and the rod-side chamber of the actuating cylinder, the directional control valve shifts application of the second fluid pressure (P2) away from the piston-side chamber of the multiplier cylinder such that the piston of the multiplier cylinder is permitted to retract the rod or series of rods into the rod-side chamber of the multiplier cylinder and to retract the piston of the actuating cylinder toward the rod-side chamber of the actuating cylinder.

17. The hydraulic clutch actuating device according to claim 13, wherein the rod or series of rods includes a rod extending from the piston of the multiplier cylinder interconnected to a rod extending from the piston of the actuating cylinder.

18. A motorized vehicle having the hydraulic clutch actuating device according to claim 13.

19. A motorized vehicle according to claim 18 in which the motorized vehicle comprises a motorcycle.

* * * * *